United States Patent [19]
Han

[11] Patent Number: 5,406,381
[45] Date of Patent: Apr. 11, 1995

[54] CHARACTER-DISPLAYED INDEX SEARCH SYSTEM AND METHOD

[75] Inventor: Hyung D. Han, Seoul, Rep. of Korea

[73] Assignee: SamSung Electronics Co., Ltd., Suwon, Rep. of Korea

[21] Appl. No.: 793,653

[22] Filed: Nov. 18, 1991

[30] Foreign Application Priority Data

Dec. 31, 1990 [KR] Rep. of Korea ............. 90-23082

[51] Int. Cl.$^6$ ............................................. H04N 5/78
[52] U.S. Cl. .................................. 358/335; 358/312; 360/72.1
[58] Field of Search .......... 358/335, 312, 342; 360/27, 33.1, 72.1, 72.2, 74.1, 10.3, 72.3, 14.2, 14.3; H04N 5/78

[56] References Cited

U.S. PATENT DOCUMENTS

| | | | |
|---|---|---|---|
| 4,419,699 | 12/1983 | Christopher et al. | 358/340 |
| 4,811,127 | 3/1986 | Okauchi | 360/27 |
| 4,956,725 | 9/1910 | Kozuki et al. | 360/12 |
| 5,012,358 | 4/1991 | Kohsaka | 360/70 |
| 5,097,348 | 3/1992 | Suetaka | 360/33.1 |
| 5,124,814 | 6/1992 | Takahashi et al. | 358/335 |
| 5,132,807 | 7/1992 | Takimoto et al. | 358/335 |
| 5,140,435 | 8/1992 | Suzuki et al. | 358/335 |

FOREIGN PATENT DOCUMENTS

| | | | |
|---|---|---|---|
| 0322909 | 6/1989 | European Pat. Off. | H04N 5/782 |
| 0393955 | 10/1990 | European Pat. Off. | H04N 5/782 |

Primary Examiner—Tommy P. Chin
Assistant Examiner—Huy Nguyen
Attorney, Agent, or Firm—Robert E. Bushnell

[57] ABSTRACT

The present invention is a character-displayed index search system for use with a video recording and reproducing system. The character-displayed index search system includes: signal recording means having a shift register, a converter, an amplifier, and a control signal recording circuit; and signal reproducing means having a control signal reproducing circuit, an index/character converter, and a character generator. The character-displayed index search system informs a user of a position of a tape including a progress time of the tape and titles of recorded programs on the tape, by reproducing each recorded program from the tape for a few seconds wherever an index signal is detected in a fast forward mode, and by repeating the detection process until the user completes selection of all desired programs. The system allows sequential play back of one or more of the selected programs after a rapid search, by using the index search operation.

17 Claims, 10 Drawing Sheets

FIG. 3A CAPSTAN CONTROL  a
FIG. 3B CONTROL 30Hz  b DUTY 60% 30Hz
FIG. 3C SUPPLY REEL PULSE  c DUTY 50%
FIG. 3D TAKE-UP REEL PULSE  d DUTY 50%
FIG. 3E HORIZONTAL SYNCHRONOUS SIGNAL 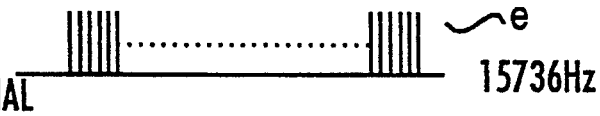 e 15736Hz
FIG. 3F REMOTE CONTROLLER INPUT  f
FIG. 3G SERIAL TRANSMISSION g { g-1 DATA, g-2 CLOCK, g-3 CS }
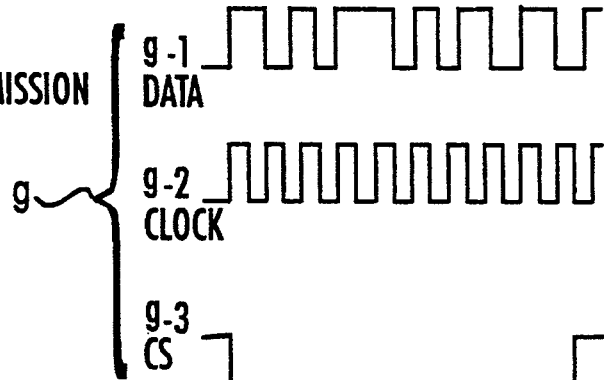
FIG. 3H OUTPUT OF SHIFT REGISTER 11  h
FIG. 3I CONVERIER 12 OUTPUT  i 30 Hz
FIG. 3J OUTPUT OF CONTROL SIGNAL REPRODUCING CIRCUIT 15  j 30 Hz

| NO | POSITION | REMARK |
|---|---|---|
| 0 | 0H 20M | NEWS10 |
| 1 | 0H 45M | KBSDRA |
| 2 | 1H 10M | ENGLIS |
| 3 | 1H 35M | TENNIS |
| PROGRAM | | 2103 |

CHARACTER-DISPLAYED INDEX SEARCH SYSTEM AND METHOD

BACKGROUND OF THE INVENTION

The present invention relates to a recording system such as a video cassette recorder system for recording a video signal and reproducing the recorded video signal with an index search function and, more particularly, to a character-displayed index search system which record both an index signal of the video signal and information about each program and displays the index signal and the information on a screen of a character generator in an index search mode.

The index search function of a conventional video cassette recorder records the index signal at a position in a recording mode or playing back mode and, if a user wants to find the position where the index signal is recorded, the tape is moved at a maximum speed and played back from the position where the index signal is detected.

If two or more index signal are recorded in the video cassette recorder with such an index search function, a fast search mode is performed from a starting position of the tape and, if the recorded index signal is detected while performing the fast search mode, the mode is converted to a reproducing mode and thus the program of the tape is reproduced for example, for about 4 or 5 seconds. If an additional mode conversion signal is not entered during the reproducing mode, the tape is moved in fast search mode again until the next index signal is detected. By repeating this operation, the program of the tape is reproduced for a few seconds whenever the index signal is detected. Thus, the user can find the desired program by viewing the screen.

In summary, the index signal recorded in the tape is detected in the fast search mode and the program of the tape is reproduced for a few seconds from the position where the index signal is detected, and the user views a short clip of each recorded program on the screen. However, in such a video cassette recorder system, it takes too much time to find the desired program plus, the programs can not be reproduced in a desired program order.

SUMMARY OF THE INVENTION

It is an object of the present invention to solve the above and other problems of the prior art and to provide a character-displayed index search system in which the tape programs can be easily and quickly searched using an index signal and information about each program which is displayed on the screen of a character generator in index search mode after the index signal and information have been recorded on the tape.

According to the present invention, a character-displayed index search system is provided for recording a video signal and reproducing the recorded video signal. The system comprises: signal recording means including a shift register for shifting serial index data, which is generated by varying the duty cycle of a control pulse from a microprocessor, a converter for receiving the data provided from the shift register and providing a tape recording signal according to the control pulse, an amplifier for amplifying a capstan control signal proportional to a speed of a capstan motor, and a control signal recording circuit for receiving the tape recording signal from the converter and recording it on the tape by a control head;

signal reproducing means composed of a control signal reproducing circuit for amplifying a signal detected by the control head; and an index and character converter for converting the output signal of the control signal reproducing circuit to index data by decoding and providing the output signal to the microprocessor, and a character generator for displaying an index signal and information about a recorded program outputted from the microprocessor.

Further feature and advantages of the present invention will become clear from the detailed description taken in conjunction with the appended drawings.

BRIEF DESCRIPTION OF THE DRAWINGS

FIGS. 3A-3J are recording circuit waveforms of the circuit of FIG. 2.

DETAILED DESCRIPTION OF THE PREFERRED EMBODIMENT

Figure 1:
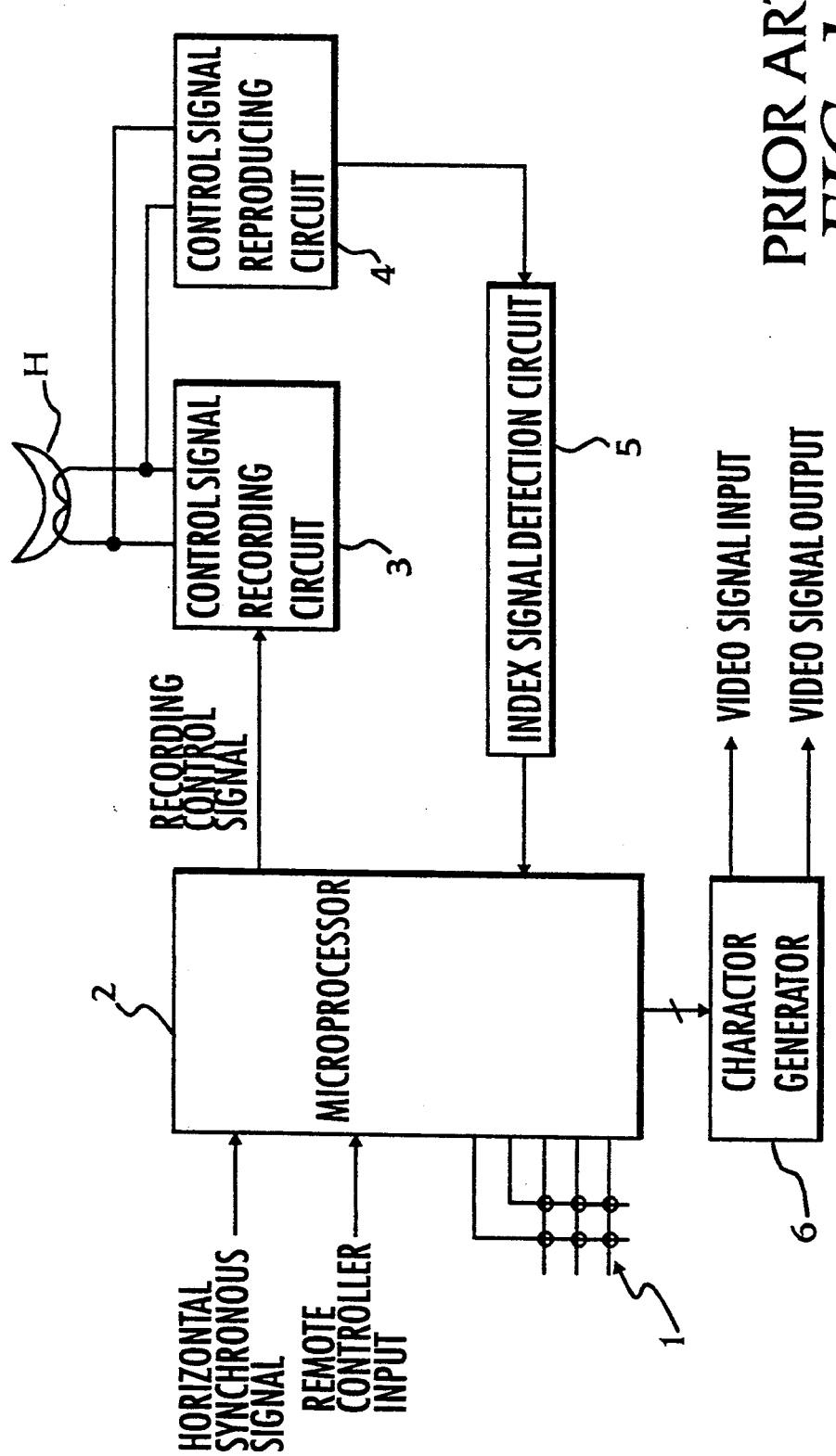
FIG. 1 is a circuit diagram of a prior art index search system.

FIG. 1 shows a circuit diagram of a prior art index search system, wherein a microprocessor 2 provides a control signal recording circuit 3 with a recording control signal corresponding to a horizontal synchronous signal of 15734 Hz and a capstan motor control pulse of 30 Hz and 60 percent duty cycle ratio under the control of an input signal from a remote controller (not shown) or a key matrix 1 so as to provide the input tape record signals through a control head H.

If an index key signal is applied from the key matrix 1 or the remote controller, the control pulse of 30 Hz and 60 percent duty cycle ratio provided from the microprocessor 2 is converted to a control signal of 30 Hz and 27.5 percent duty cycle ratio, and the converted control pulse is recorded on a tape. The control pulse when detected from the tape by the control head H is amplified by a control signal reproducing circuit 4 and the amplified signal is provided to an index signal detection circuit 5. The index signal detection circuit 5 provides an index signal to the microprocessor 2 which operates a reproducing mode for a few seconds. The reproduced signal is displayed on a screen through a character generator 6.

Figure 2:
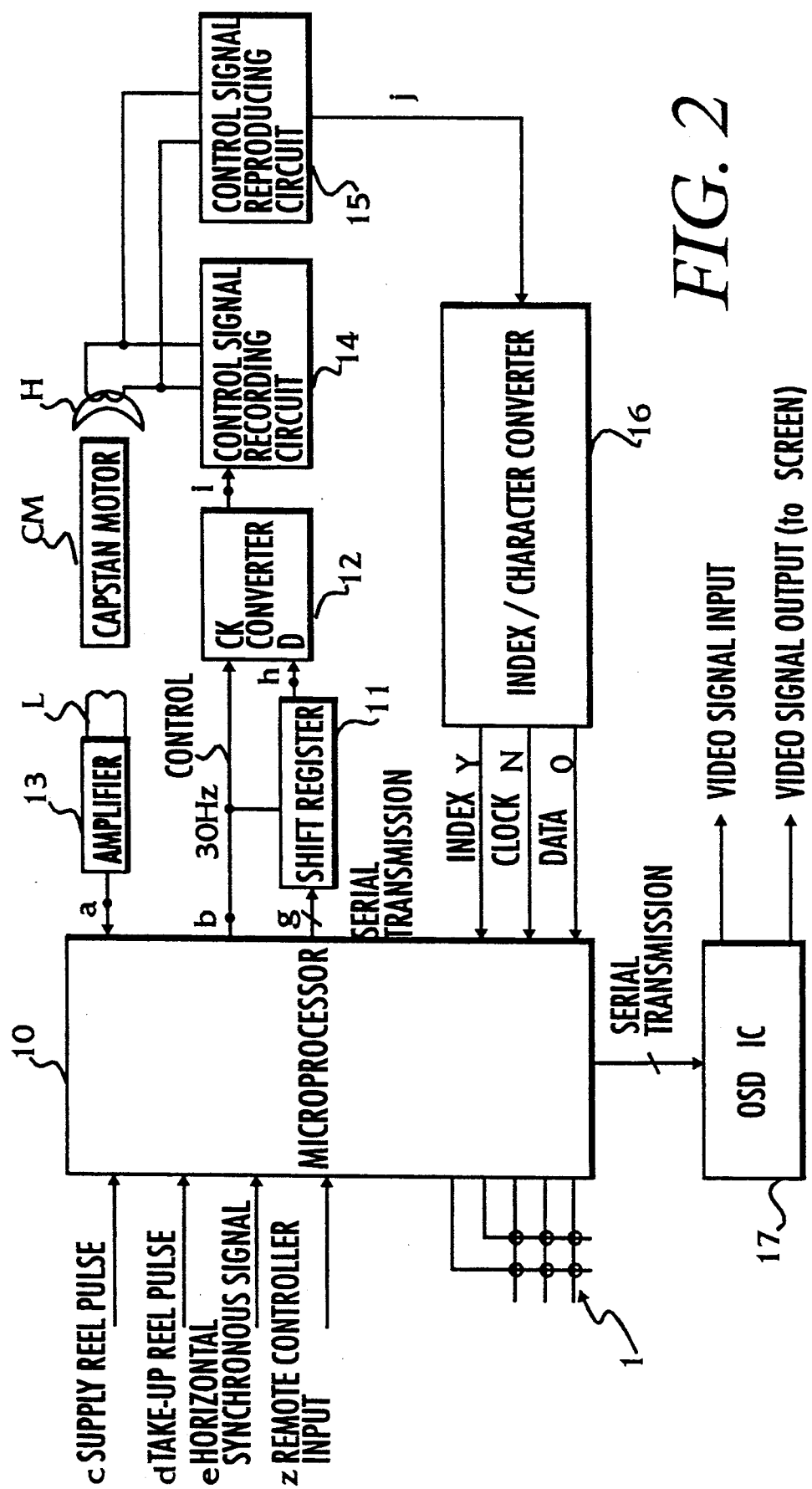
FIG. 2 is a circuit diagram of an index search system according to the present invention.

FIG. 2 shows a circuit diagram of a character-displayed index search system according to the present invention. In FIG. 2, a shift register 11 receives the serial data g from a microprocessor 10 which controls the system according to input signal provided from a remote controller (not shown) or a key matrix 1. The shift register 11 shifts the received serial data by a control pulse b of 30 Hz. A converter 12 receives the shifted data from shift register 11 and the control pulse b from the microprocessor 2, and generates a record signal i. An amplifier 13 amplifies a capstan control signal which is proportional to a speed of a capstan motor CM and detected at a coil L of the capstan motor CM, and provides the amplified signal a to the microprocessor 10. A control signal recording circuit 14 is connected to an output of the converter 12 and records the output signal i of the converter 12 through the head H. An index/character converter 16 is connected to a control signal reproducing circuit 15 which plays back the control signal from the tape to the microprocessor 10 as detected by control output index data of the recorded control signal. A character generator 17 is connected to an output terminal of the microprocessor 10 to display serial data provided from the microprocessor 10 of a display screen.

Figure 4:
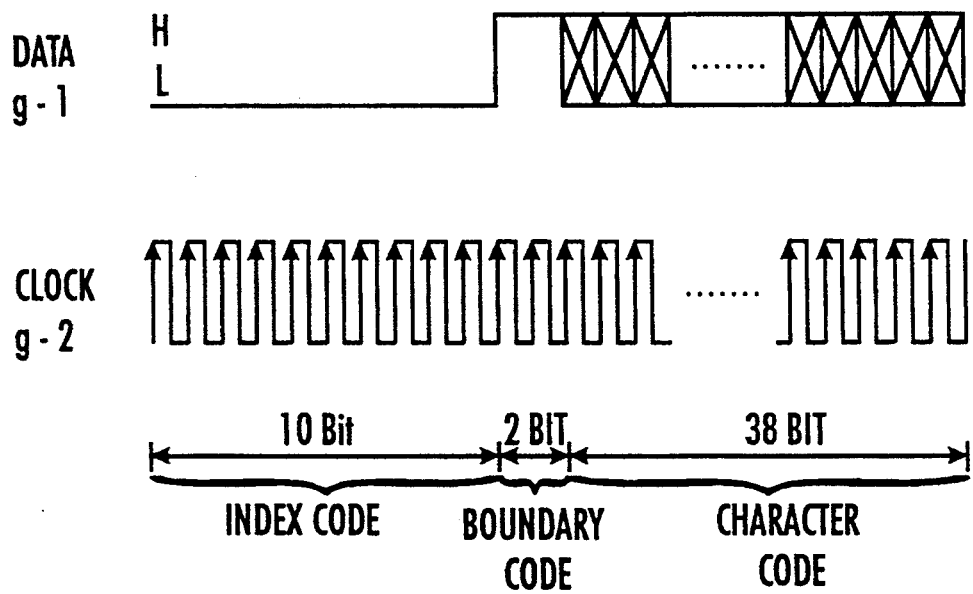
FIG. 4 is a view of waveforms showing serial index data g according to the present invention.

FIG. 3 shows the waveforms of the circuit of FIG. 2, and FIG. 4 shows waveforms of the serial data g of FIGS. 2 and 3.

Figure 5:
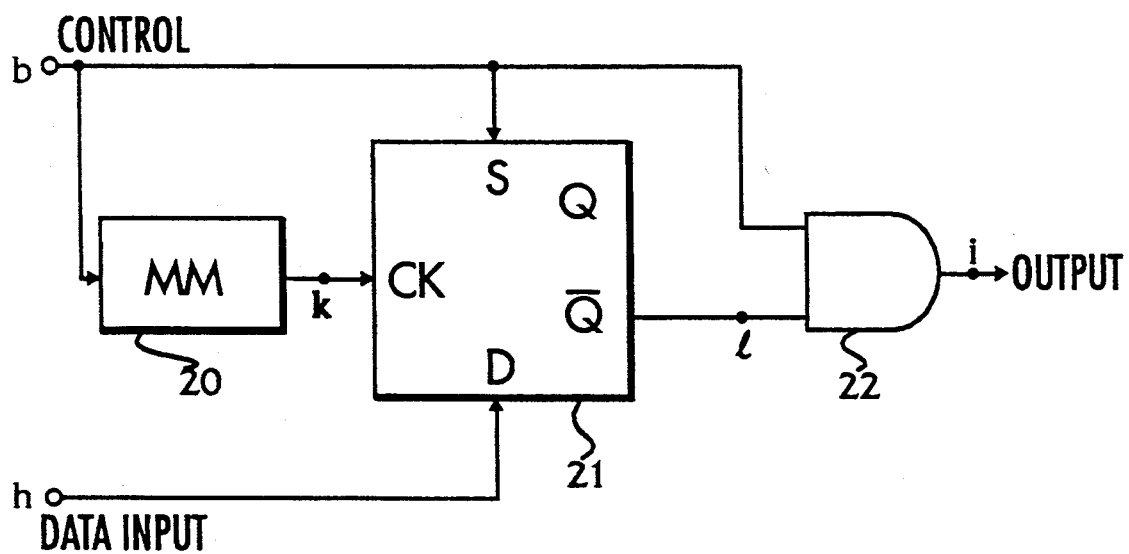
FIG. 5 is a circuit diagram of one embodiment of a converter according to the present invention.

FIG. 5 is a detailed circuit diagram of the converter 12 in FIG. 2, which comprises a monostable multivibrator 20, a flip-flop 21, and an AND gate 22.

Figure 6:
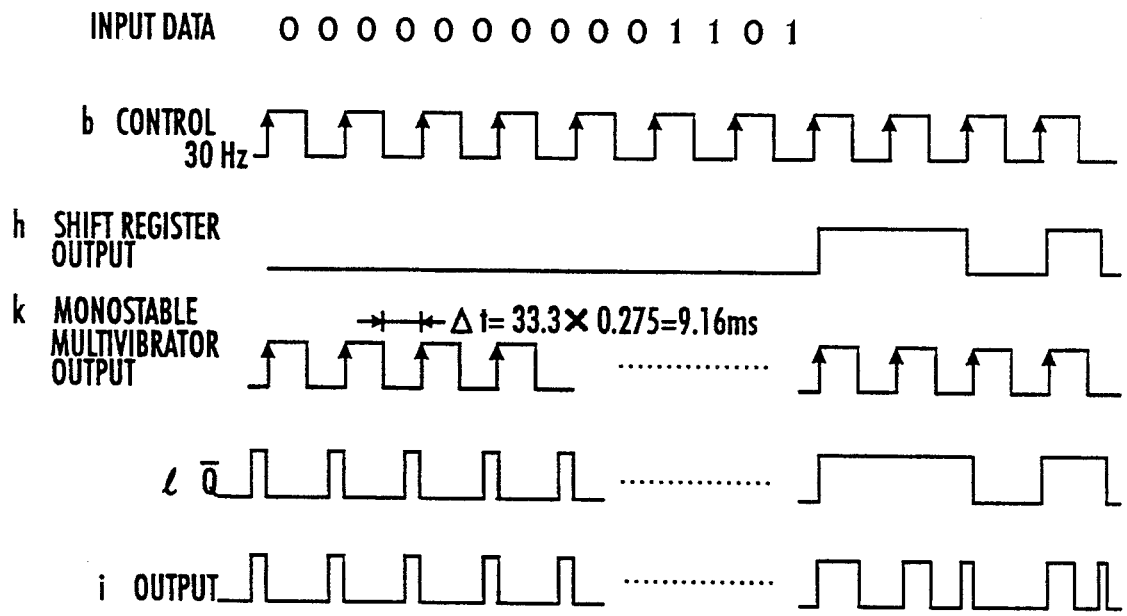
FIG. 6 is a view of waveforms of the circuit of FIG. 5.

FIG. 6 shows waveforms of the circuit of FIG. 5.

Figure 7:
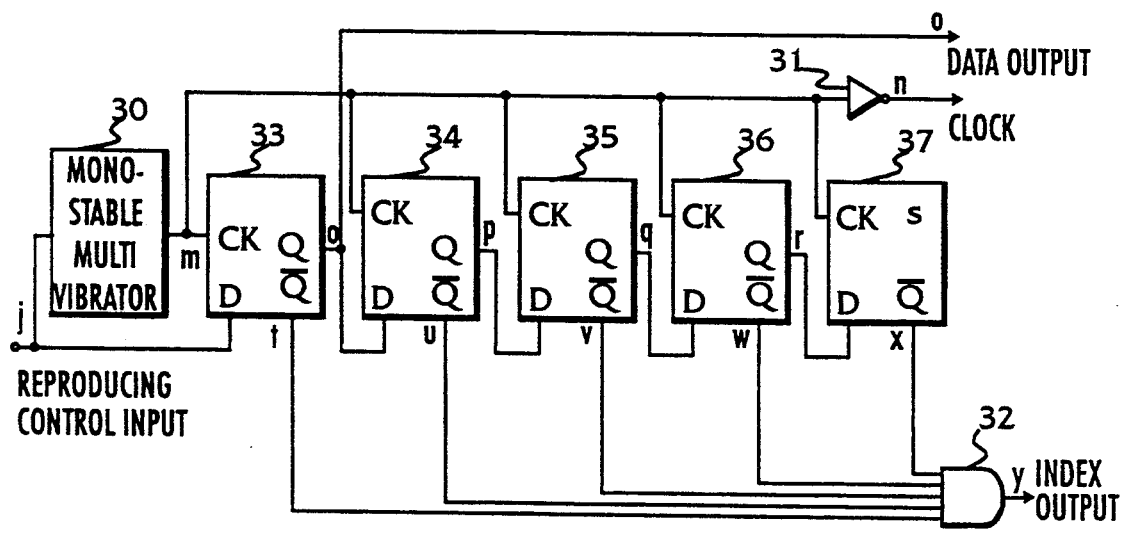
FIG. 7 is a circuit diagram of one embodiment of an index or character converter according to the present invention.
Figure 8:
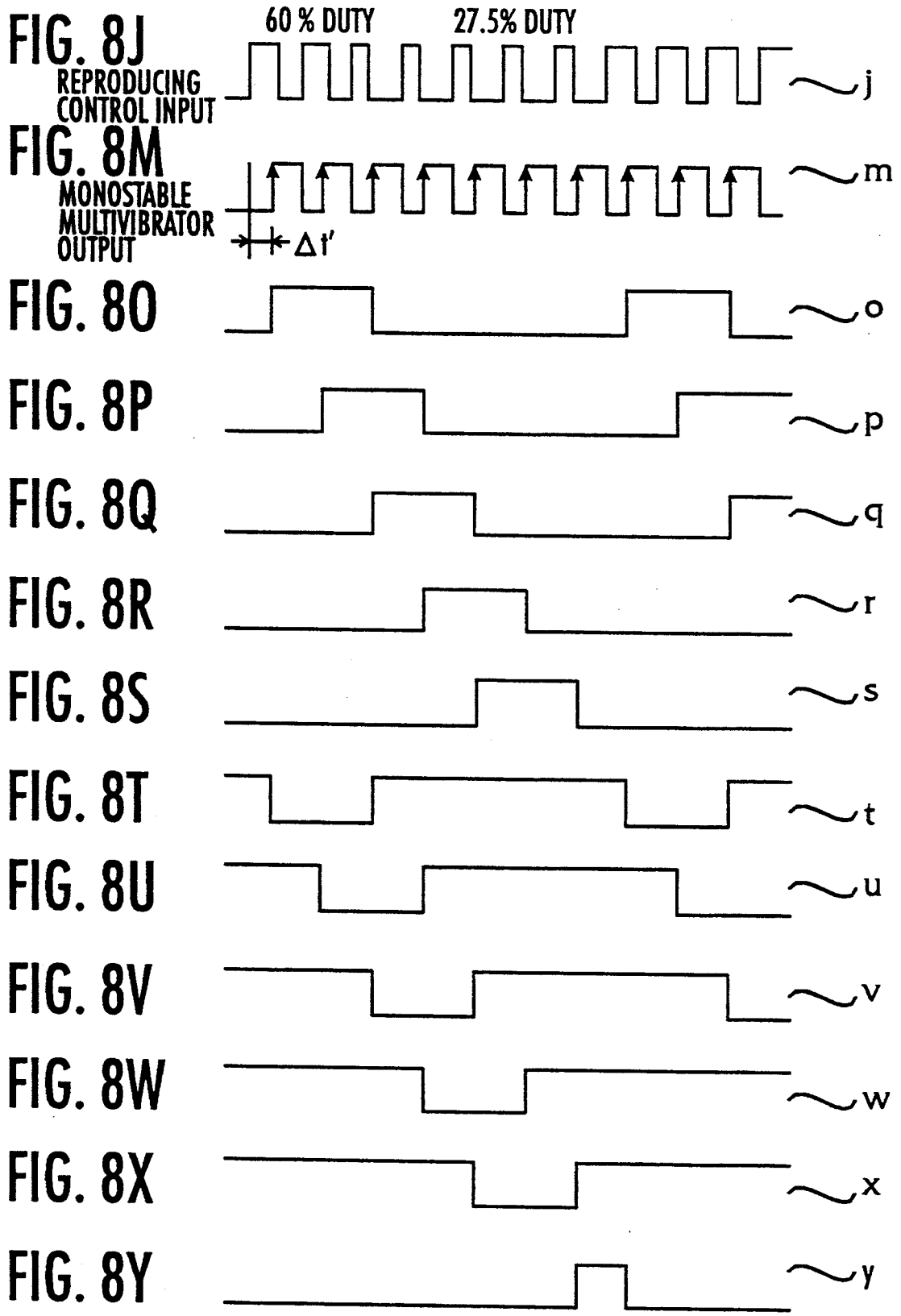
FIGS. 8J-8Y are reproducing circuit waveforms of the circuit of FIG. 7.
Figure 9:
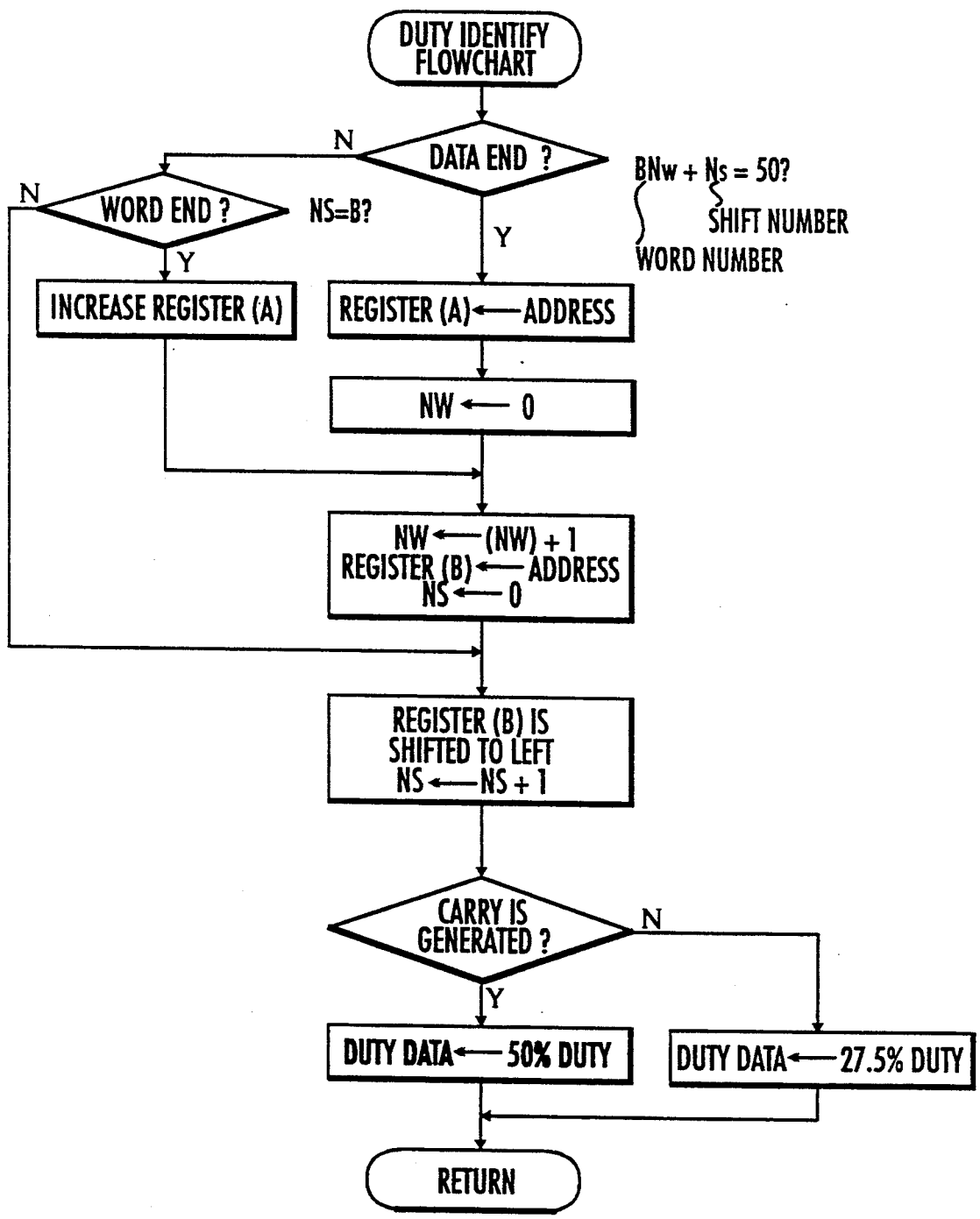
FIGS. 9-13 are flowcharts of programs executed in the microprocessor according to the present invention.

FIG. 7 is a detailed circuit diagram of the index and character converter 16 of FIG. 2, which comprises a monostable multivibrator 30, an inverter 31, an AND gate 32, and five flip-flop 33–37. The number of flip-flops is variable depending on a number of bits of the index signal, i.e., the number of flip-flops is equal to the number of bits of the index signal y. FIG. 8 shows waveforms of the circuit of FIG. 7.

FIGS. 9–13 show flowcharts of programs executed in the microprocessor 10 for controlling the system according to the present invention.

Figures 12, 14:
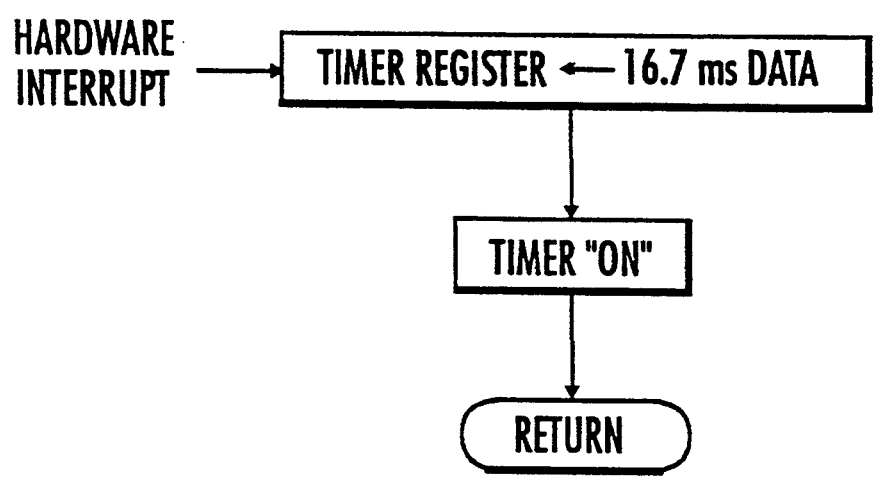
FIG. 14 shows a screen where the index character information is displayed.
Figure 13:
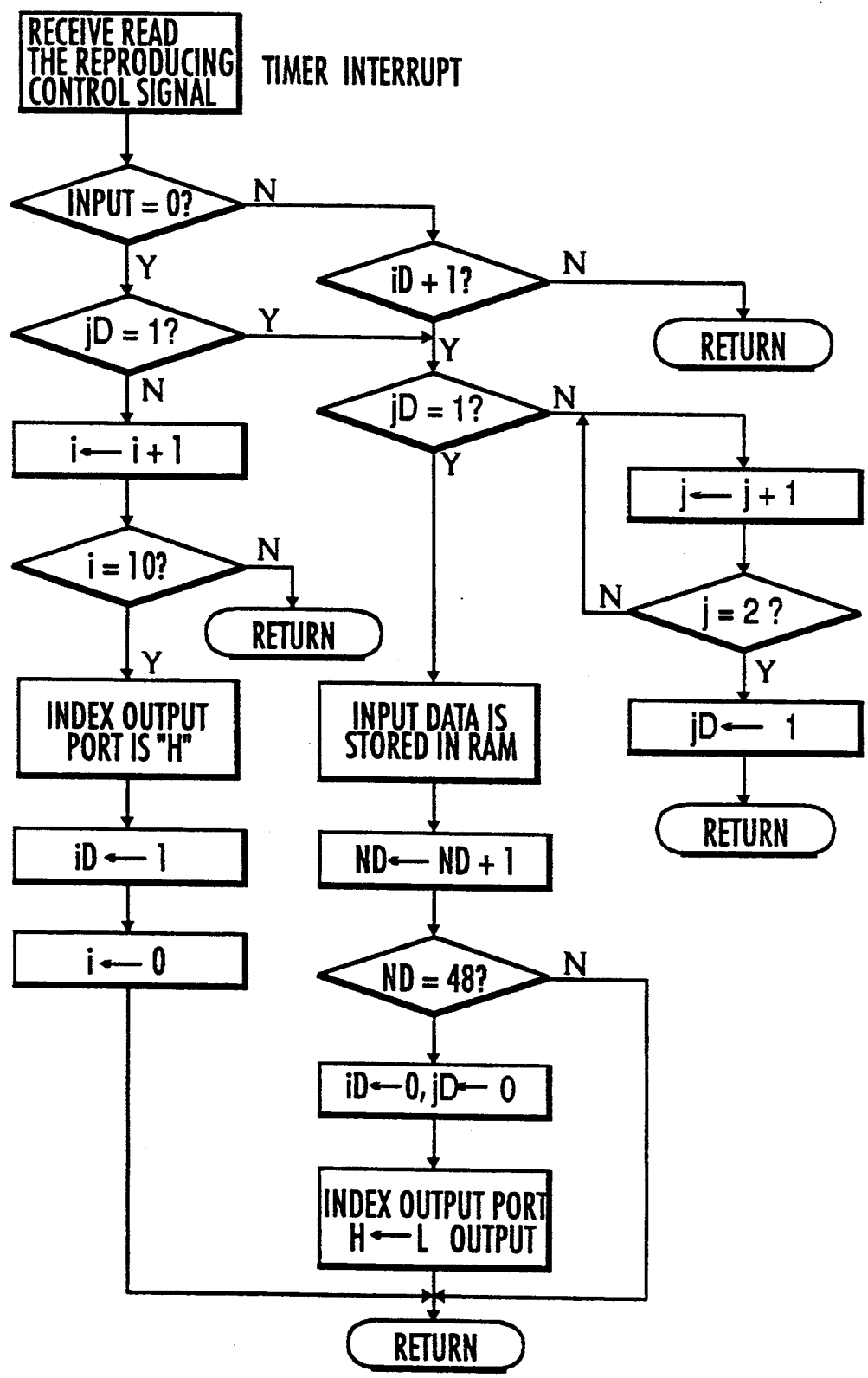

FIG. 14 shows sample serial data provided from the microprocessor 10 and displayed on a screen by the character generator 17.

In the present invention described as above, while the microprocessor 10 of FIG. 2 performs the record mode, an input horizontal synchronous signal e of 15743 Hz is divided by a factor of 525 and a control pulse b of 30 Hz and 60 percent duty cycle is generated as shown in FIG. 3B. The control pulse b is provided from the microprocessor 10 to both the shift register 11 and the converter 12. A capstan control signal proportional to a speed of a capstan motor CM is detected by the coil L and subsequently amplified by the amplifier 13. The amplified signal is applied to the microprocessor 10. The microprocessor 10 determines a period of a supply reel pulse c and a take-up reel pulse d shown in FIG. 3 by counting the amplified capstan control pulses a in a forward mode of the tape. The supply reel pulse c and the take-up reel pulse d provided to the microprocessor 10 have a 50 percent duty cycle and are proportional to the speed of each reel, i.e., the periods of each reel depend on the amount of tape wound to each reel.

After calculating the periods of the supply reel pulse c and the take-up reel pulse d by counting the amplified capstan control pulses a, a progress time of the tape is determined as a function of the periods Ts and Tt of the supply reel pulse c and the take-up reel pulse d, respectively. That is, the progress time of the tape is determined as $$Tp = K\left(\frac{Tt^2}{\alpha} - \beta\right)$$

where $\alpha$ is a thickness of the tape, $\beta$ is a hub diameter of the tape, and K is a constant. The hub diameter $\beta$ generates a difference by Ts+Tt, and the progress time Tp is determined by comparing a present time value with a previous time value. In other words, the microprocessor 10 determines both the period Ts of the supply reel pulse c and the period Tt of the take-up reel pulse d by counting the capstan control pulses and, by using the values Ts and Tt, the progress time of the tape is determined, based on a standard play mode.

The process for recording the index signal and the character signal is described as follows. If a character key signal is transmitted from the key matrix 1 or the remote controller, the microprocessor 10 recognizes the character key signal and provides the serial data to the character generator 17, thereby displaying a message for inputting characters onto the screen of the character generator 17. While the message is displayed on the screen, the microprocessor 10 remains in a standby state for receiving operator inputs and converting a number input into a corresponding character.

If the character key signal is transmitted to the microprocessor 10 from the key matrix 1 or the remote controller, the message for character input is displayed on the screen of the character generator 17 and, subsequently, if a number key signal is entered, the microprocessor 10 recognizes it as representing a character which is then displayed. For example, if a '0'-key is pressed, 'A' is displayed, and if a '1'-key is pressed, 'B' is displayed. On the other hand, if the index key signal is transmitted from the key matrix 1 or the remote controller to the microprocessor 10, the microprocessor 10 enters the index signal recording mode.

A signal for selecting the title and index of the program as shown in FIGS. 3G–3I and the serial index data g are provided from the microprocessor 10. The serial index data g is divided into three parts, an index code part, a boundary code part between an index code and a character code, and a character code part as shown in FIG. 4. For example, when the serial index data g has a total of 60 bits, the first 10 bits are all low for the index code part, the next 2 bits are all high for the boundary code part, and the last 48 bits are high or low for the character code part, depending on the input character signal. Logic low or high of the serial index data g is determined depending on the duty cycle of the control signal b, that is, if the control signal b has a 27.5 percent duty cycle, a logic low is determined while, if the control signal b has the 60 percent duty cycle, a logic high signal is determined. Thus, in order to generate the serial index data g, first, the duty cycle of the control signal b is converted from 60 percent to 27.5 percent and 10 pulses of this converted control signal are provided as the index code, then two pulses of the control signal b having the 60 percent duty cycle are provided, and finally the combined pulses of 60 percent to 27.5 percent duty cycle of the control signal b are outputted depending on the character signal.

The shift register 11 sequentially shifts the serial index data g comprising the index code, the boundary code, and the character code. The output signal h of the shift register 11 and the control signal b are applied to the converter 12. The converter 12 of FIG. 5 operates by the signal h of FIG. 3H being applied to a first input terminal of the flip-flop 21 and the control signal b is applied to the monostable multivibrator 20. The control signal b is delayed by 9.16 ms in the monostable multivibrator 20, that is, a time necessary to convert the duty cycle of the control signal b from 60 percent to 27.5 percent, and this delayed control signal k is provided to a clock terminal of the flip-flop 21. At the same time, the control signal b is provided to a second input terminal of the flip-flop 21, and the output waveform 1, as shown in FIG. 6, is generated from the flip-flop 21. Subsequently, the output signal I of the flip-flop 21 and the control pulse b are applied to an AND gate 22, and the AND gate 22 produces a signal i as shown in FIG. 6.

The output signal i of the converter 12 comprising the monostable multivibrator 20, the flip-flop 21, and the AND gate 22 shown in FIG. 5, is applied to the control signal recording circuit as shown in FIG. 2. Then the control signal recording circuit 14 records data onto the tape through head H, according to the output of the converter 12.

As mentioned above, the user may press a character key at a desired position of the tape while viewing the screen of the character generator 17 when the microprocessor 10 is in standby mode to receive and convert the input character. If the title of the program is transmitted by using the number keys corresponding to characters, and then the index key is pressed, the serial index data g composed of the 10-bit index code, the 2-bit boundary code, and the 48-bit character code as shown in FIG. 4, is applied to the shift register 11. After the shifted signal h is applied to the converter 12 and converted to the final recording signal i, the converted signal is recorded onto the tape through the head H by the control signal recording circuit 14.

The process for reproducing the index signal recorded on the tape is as follows. In the fast forward mode of the video cassette recorder, except for the record mode, the control signal detected at the head H is amplified by the control signal reproducing circuit 15 and the amplified signal j is applied to the index and character converter 16. Referring to FIGS. 7 and 8, the detected control signal j of FIG. 3J is applied to the monostable multivibrator 30 shown in FIG. 7 and delayed by 16.67 ms, that is, a time necessary to generate the control pulse having a 60 percent duty cycle. The control signal in FIG. 8J and the delayed signal in FIG. 8M are applied to the input terminal and the clock terminal of the flip-flop 33 respectively. Then the flip-flop 33 provides the signal o of FIG. 8O and the output signal m of the monostable multivibrator 30 is applied to the inverter 31. The inverted signal n is applied to the microprocessor 10. The signal o is applied to the input terminal of the flip-flop 34. Next, the output p of the flip-flop 34 shown in FIG. 8P is applied to the input of flip-flop 35.

Flip-flops 36 and 37 are similarly connected. The inverted output signals t, u, v, w, and x of the flip-flops 33, 34, 35, 36 and 37 are applied to five inputs of AND gate 32, and signal y shown in FIG. 8Y is generated. If the index and character converter 16 comprises five flip-flops as shown in FIG. 7, when five control pulses with 27.5 percent duty cycle are applied, the index signal y is high. If the index and character converter 16 comprises ten flip-flops, one pulse of index signal y is provided only when all ten control pulses are simultaneously applied. The control signal j in FIG. 8J is delayed by the monostable multivibrator 30 and this delayed signal j is used as a clock signal in the index/character converter 16. On the other hand, the output signal m of the monostable multivibrator 30 is inverted by the inverter 31 and this signal n is subsequently applied to the microprocessor 10. The microprocessor 10 then abandons the boundary code and receives only the character code. Also, the microprocessor 10 converts the output signal y in FIG. 8Y of the index and character converter 16 to character information and provides corresponding serial data to the character generator 17 to display. Thus, the title of the program is displayed on the screen in the index search mode. If the title number of the program is selected and the index key is pressed, or the number appearing on the screen is directly pressed in the index search mode, the tape is moved to the index position corresponding to the selected number and the reproducing mode is automatically carried out. If two or more numbers are selected, the programs are sequentially reproduced.

Figure 10:
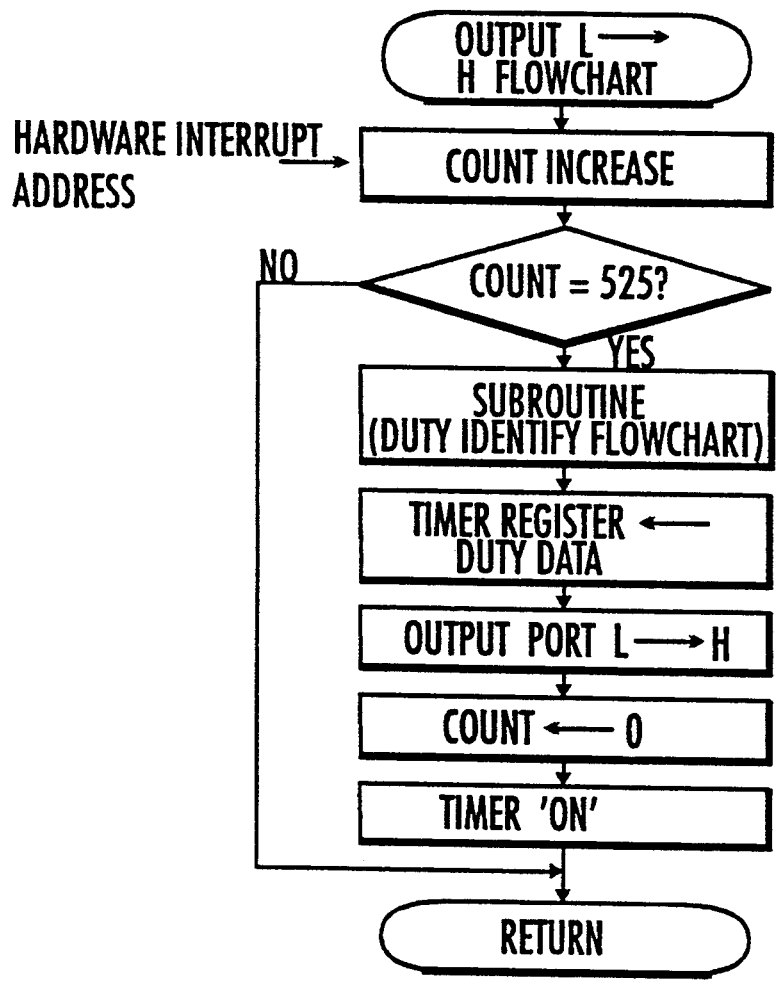
Figure 11:
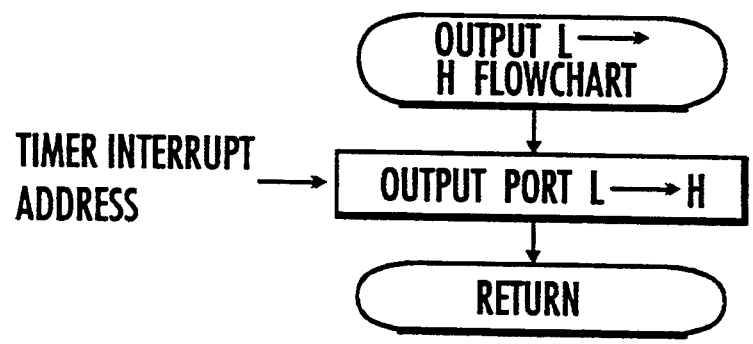

FIGS. 9–13 show flowcharts for controlling the recording means comprising the shift register 11 and the converter 12, and the reproducing means comprising the index and character converter 16. As shown in FIG. 10, the horizontal synchronous signal e is counted and subsequently divided by a factor of 525. After division by 525, the system is controlled according to the flowchart shown in FIG. 9. Input of the 60-bit data is checked for completion. If the 60-bit data is complete, a starting address of stored data is provided to register A, but if the 60-bit data is not complete, the number of shifts is checked. If the number of shifts is eight, the address value stored in the register A is increased. At this time, the input data is composed of the 10-bit index code, the 2-bit boundary code, and the 48-bit character code. If a data bit is entered, the data at an address assigned by a register B is retrieved and the number of shifts is cleared. Next, the data in the register B is repeatedly shifted left, and a carry generated by the shift operation is checked. If the carry is generated, the duty cycle data corresponds to 60 percent, while, if no carry is generated, the duty cycle data corresponds to 27.5 percent. The duty cycle data is provided to a time register to determine the delay time. Thus, for the 60 percent duty cycle, the control pulse is delayed by 20 ms, while, for 27.5 percent duty cycle, the control pulse is delayed by 9.17 ms. The duty cycle data is stored in the timer register as shown in FIG. 10, and then the control signal b provided from the microprocessor 10 is changed from low to high. By the control signal b being high, the shift register 11 and the converter 12 are driven, and also, the timer is driven with an initial value, carrying out the index search mode. After carrying out the index search mode, the control signal b provided from the microprocessor 10 is changed from high to low after 20 ms or 9.178 ms according to the duty cycle, completing the recording of the index signal.

FIG. 12 shows a flowchart for controlling the index/character converter 12. Data corresponding to a reference time of 16.7 ms is recorded in the timer register by the external interrupting request signal and the timer starts. After setting the timer, referring to FIG. 13, if the input control signal is low, random access memory iD is checked to be either low or high, and is recorded as high only when ten successive pulses of the control signal b have the 27.5 percent duty cycle. If the random access memory iD is not high, the index data output port is set to high when the input ten pulses of the control signal b have the 27.5 percent duty cycle. If the input control signal b is not low, another random access memory jD is checked to be either low or high, and is recorded as high when the random access memory jD is high and the 2-bit boundary code is received. If the random access memory jD is not high, the register j which is used to count the number of bits of the boundary code is increased and, if j=2, the random access memory jD is set to high.

Subsequently, if the input control signal is not low, and iD=jD=high, the input character code is stored in random access memory until the number of received bits of the input character code becomes 48. If the 48 bits of character code are all received, the random access memory jD is set to D and the index output port is changed from high to low.

As mentioned above, according to the present invention, the character-displayed index search system for the video cassette recorder which can record the index signal can inform the user of the position of a tape using the progress time of the tape and the title of the program, by reproducing the program in the tape for about 5 seconds whenever the index signal is detected in the fast forward mode and repeating this process until the user selects desired programs which can be sequentially played back in the order selected by the user after selecting one or more programs following the rapid search of the index search operation.

What is claimed is:

1. A character-displayed index search system for use in a video recording/reproducing system for recording and reproducing an index signal on or from a tape, said index signal corresponding to a program recorded on or reproduced from said tape, respectively, said character-displayed index search system comprising:

a microprocessor for generating a control signal and for generating serial index data by converting select pulses of the control signal from pulses having a first duty cycle to pulses having a second duty cycle, said serial index data comprising pulses having said first duty cycle and pulses having said second duty cycle;

signal recording means comprising a shift register for shifting, in dependence upon said control signal from said microprocessor, said serial index data, a converter for receiving the shifted serial index data from said shift register and said control signal for generating an index recording signal, and a control signal recording circuit for receiving said index recording signal from said converter and for recording said index recording signal onto a tape through a head; and signal reproducing means comprising a control signal reproducing circuit for amplifying said recorded index recording signal detected on the tape by said head, an index/character converter for convening the amplified index recording signal from said control signal reproducing circuit to an index/character signal by decoding said amplified index recording signal and providing the index/character signal to said microprocessor, said microprocessor convening said index/character signal to a character data information signal, and a character generator for receiving said character data information signal, said character data information signal corresponding to a recorded program, and for generating character data for display on a screen.

2. The character-displayed index search system according to claim 1, wherein said converter comprises:

a monostable multivibrator for providing an output signal by delaying said control signal;

a flip-flop for receiving said output signal of said monostable multivibrator at a clock input terminal, receiving the control signal at a first input terminal, and receiving the shifted serial index data of said shift register at a second input terminal; and a logic gate for producing the index recording signal by combining an inverted output of said flip-flop with said control signal.

3. The character-displayed index search system according to claim 1, wherein said index/character converter comprises:

a monostable multivibrator for providing an output signal by converting pulses of the amplified index recording signal to pulses having said first duty cycle; an inverter for inverting the output signal of said monostable multivibrator and providing an inverted signal as a clock signal to said microprocessor;

a first flip-flop for receiving the output signal of said monostable multivibrator at a clock terminal and for receiving said amplified index recording signal at a first input terminal, said first flip-flop producing a first flip-flop output signal and producing an inverted first flip-flop output signal, said first flip-flop output signal being a character signal of said index/character signal;

a second flip-flop for receiving the output signal of said monstable multivibrator at a clock terminal and for receiving said character signal at a second input terminal, said second flip-flop producing a second flip-flop output signal and producing an inverted second flip-flop signal; and a logic gate for producing an index signal of said index/character signal by logically combining the first and second inverted flip-flop signals.

4. The character-displayed index search system according to claim 1, wherein said index/character signal comprises a serial combination of a ten-bit index signal, a two-bit boundary signal, and a forty-eight-bit character signal.

5. The character-displayed index search system according to claim 1 wherein the first duty cycle is 60% and the second duty cycle is 27.5%.

6. A character-displayed index search system for use in a video recording/reproducing system for recording and reproducing an index signal on or from a recording medium, said index signal corresponding to a program recorded on or reproduced from said recording medium, respectively, said character-displayed index search system comprising:

character generating means for displaying a message on a screen in response to a character key signal corresponding to a character key of a keypad being activated, said message prompting a user to input an index code and a character code for identifying a program to be recorded onto said recording medium;

means responsive to said index code and said character code for generating said index signal;

recording means for recording said index signal on said recording medium when said corresponding program is recorded, said index signal comprising the index code, a boundary code and the character code, in response to an index key signal corresponding to an index key of the keypad being activated, the recording means comprising:

microprocessing means for generating a control signal and for generating serial index data by varying the duty cycle of select pulses of said control signal, shifting means for shifting said serial index data in response to said control signal;

converter means for producing an index recording signal in response to the shifted serial index data and the control signal, and a control signal recording circuit for receiving said index recording signal from said converter means and for recording the index recording signal on the recording medium via a control head; and reproducing means for reproducing said recorded index signal from the recording medium in response to a selection key signal corresponding to a selection key of the keypad being activated.

7. The character-displayed index search system of claim 6, wherein said converter means comprises:

a monostable multivibrator for providing an output signal by delaying the control signal for a period equal to a time taken to convert pulses of said control signal having a sixty percent duty cycle to pulses having a twenty-seven and one-half percent duty cycle;

a flip-flop for producing an output signal in response to receiving the shifted serial index data at a first input terminal, receiving the output signal of said monostable multivibrator at a clock terminal, and receiving the control signal at a second input terminal; and a logic gate for generating the index recording signal in response to the output signal of said flip-flop and the control signal.

8. The character-displayed index search system according to claim 6, wherein said reproducing means comprises an index-to-character converter comprising:

a monostable multivibrator for producing an output signal by converting pulses of the reproduced index signal to pulses having a sixty percent duty cycle;

an inverter for inverting the produced output signal for providing an inverted signal as a clock signal for a microprocessor;

a first flip-flop for producing first and second output signals in response to receiving the produced output signal at its clock terminal and receiving the reproduced index signal at a first input terminal;

a second flip-flop for producing third and fourth output signals in response to receiving the produced output signal at a its clock terminal and receiving the first output signal at a second input terminal; and a logic gate for reproducing the recorded index signal by logically combining the second and fourth output signals.

9. The character-displayed index search system according to claim 6, wherein the index code has ten bits, the boundary code has two bits, and the character code has forty-eight bits.

10. A video cassette recorder comprising:

a control head for recording and reproducing a record signal, for identifying a program on a magnetic tape, onto and from a control track of the magnetic tape;

a microcomputer for controlling an index search of the magnetic tape, for generating a control signal comprising pulses having a first duty cycle, and for generating a data signal by converting selected pulses of said control signal to pulses having a second duty cycle;

a shift register for shifting said data signal, supplied from the microcomputer, in response to said control signal output from the microcomputer, said data signal comprising an index code corresponding to a program number, a boundary code, and a character code representing identifying information the program;

converting means for generating a converted signal by combining the shifted data signal and the control signal;

a control signal recording circuit connected to the control head for enabling said control head to record said converted signal, said converted signal being the record signal, onto the control track of said magnetic tape;

a control signal reproducing circuit for amplifying the reproduced record signal from said control head; and data generating means for generating the index code, a clock signal and the character code corresponding to said amplified reproduced record signal, and displaying said index code and character code on a monitor.

11. A method of recording and reproducing a record signal identifying a program to be recorded on and reproduced from a medium for storing information in a video recording/reproducing system, said method comprising the steps of:

inputting a character code to identify said program to be recorded on said medium for storing information;

generating a control signal having pulses of a first duty cycle;

generating index data by converting select pulses having said first duty cycle of said control signal to pulses having a second duty cycle, said index data comprising pulses having said first duty cycle and pulses having said second duty cycle;

shifting said index data in response to said control signal, said index data having a format comprising an index code for indicating a start of the program, a boundary code for buffering the index code from the character code, and the character code for identifying the program;

generating said record signal by combining said shifted index data and said control signal; and recording said record signal and said program identified by said record signal on the medium for storing information.

12. The method of claim 11 wherein the index code corresponds to a program number on the medium for storing information.

13. The method of claim 12 wherein the first duty cycle is 60% and the second duty cycle is 27.5%.

14. The method of claim 11 wherein the index code is ten bits, the boundary code is two bits and the character code is forty-eight bits.

15. The method of claim 11, further comprising the steps of:

counting capstan control pulses of a capstan coil, said capstan control pulses being proportional to a speed of a capstan motor; and determining a position of the medium for storing information by calculating periods of a supply reel pulse and a take-up reel pulse in response to said counting step.

16. The method of claim 11, further comprising the steps of:

detecting and reproducing the record signal from the medium for storing information during a fast forward mode;

converting the reproduced record signal to the index code, the character code and a clock pulse; and converting said index code and said character code to display data for display on a screen.

17. The method of claim 11, said step of generating said record signal comprises the steps of:

delaying said control signal by a predetermined delay time to generate a delayed control signal;

providing said delayed control signal a clock input of a flip-flop;

providing said shifted index data to a first input terminal of said flip-flop;

providing said control signal to a second input terminal of said flip-flop; and providing an output of an inverting terminal of said flip-flop and said control signal to an AND gate to generate said record signal.

* * * * *